United States Patent [19]

Takasugi

[11] Patent Number: 5,362,386
[45] Date of Patent: Nov. 8, 1994

[54] SUPPORT MECHANISM OF OVERFLOW WEIR IN SEWAGE DISPOSAL TANK

[75] Inventor: Masataka Takasugi, Ohsuki, Japan

[73] Assignee: Yamashou Sangyo Kabushiki Kaisha, Yamanashi, Japan

[21] Appl. No.: 171,680

[22] Filed: Dec. 22, 1993

[30] Foreign Application Priority Data

Mar. 19, 1993 [JP] Japan .................................. 5-085526

[51] Int. Cl.⁵ ........................................... B01D 21/02
[52] U.S. Cl. .................................. 210/206; 210/259; 210/540; 210/195.3
[58] Field of Search ................ 210/195.1, 195.3, 195.4, 210/259, 521, 522, 538, 540, 206, 207

[56] References Cited

U.S. PATENT DOCUMENTS

| | | | |
|---|---|---|---|
| 3,383,427 | 5/1975 | Oldham et al. | 210/195.4 |
| 3,907,672 | 9/1975 | Milne | 210/195.4 |
| 3,971,719 | 7/1976 | Peters | 210/540 |
| 4,867,872 | 9/1989 | Russel et al. | 210/540 |
| 4,892,666 | 1/1990 | Paulson | 210/540 |
| 5,132,010 | 6/1992 | Ossenkop | 210/540 |

*Primary Examiner*—Christopher Upton
*Attorney, Agent, or Firm*—Browdy and Neimark

[57] ABSTRACT

In order to easily and correctly adjust and set horizontality of an overflow weir in a treatment tank, the center portion of the overflow weir is supported through a fulcrum shaft in such a manner that the overflow weir can swing to the right and left, and an adjustment position fixing member is engaged with the overflow weir.

2 Claims, 3 Drawing Sheets

SUPPORT MECHANISM OF OVERFLOW WEIR IN SEWAGE DISPOSAL TANK

BACKGROUND OF THE INVENTION

1. Field of the Invention

This invention relates to a support mechanism of an overflow weir in a sewage DISPOSAL tank.

2. Description of the Related Art

A sewage disposal tank is generally installed on a concrete foundation. Therefore, if the concrete foundation is laid down non-horizontality, the sewage disposal tank inclines quite naturally, and overflow weirs in treatment chambers incline, too, due to this inclination, so that water overflows via only notches on the inclined side and cannot uniformly overflow via all the notches as expected originally with the overflow weir. For this reason, the overflow weir of the sewage disposal tank is ordinarily supported by a support mechanism having a horizontality adjustment function.

A suitable support mechanism of an overflow weir according to the prior art as an comparative example with the present invention is illustrated in FIG. 5 of the accompanying drawings. Namely, both ends of a fitting substrate b are supported at inner upper portions of a treatment chamber a and both ends of a sheet-like overflow weir d equipped with a large number of V-shaped notches c for overflowing water are fixed to the surface of the substrate b by means of set screws e and elongated holes f.

In the support mechanism of the overflow weir according to the prior art described above, both ends of the overflow weir d are fixed by the set screws e. When horizontality adjustment of the overflow weir d is made, therefore, the two set screws e must be loosened individually, the overflow weir d must be supported under the horizontal posture using the two set screws e as the guide while the screws are kept loosened and moreover, these two set screws e must be finally fastened under this support state. However, these procedures are carried out while the overflow weir d is allowed to freely move in irregular directions such as in longitudinal and oblique directions, and it is very difficult for this reason to correctly set the overflow weir to the horizontal posture without permitting it to freely move.

SUMMARY OF THE INVENTION

It is therefore an object of the present invention to facilitate the horizontality adjustment of the overflow weir by supporting the center portion of the overflow weir by a fulcrum shaft in such a manner as to permit it to swing, and to altogether eliminate the problems with the prior art support mechanism described above.

In a sewage disposal tank of the type wherein an overflow weir equipped at the upper edge thereof with a large number of V-shaped notches formed continuously for permitting natural overflowing of water at the time of the rise a water level is transversely supported by support means in a plurality of treatment chambers constituting the sewage disposal tank, a support mechanism of an overflow weir for accomplishing the object of the invention described above has a construction wherein the support means of the overflow weir pivotally supports via a fulcrum shaft the center portion of the overflow weir in such a manner that the overflow weir can swing to the right and left, and a swing position fixing member is engaged with the overflow weir.

DESCRIPTION OF THE PREFERRED EMBODIMENTS

Figure 1:
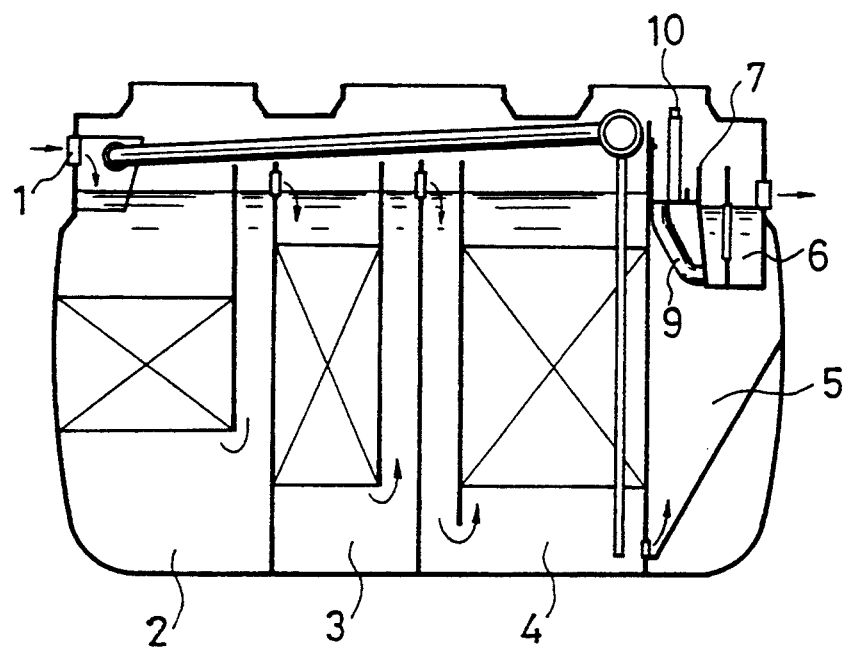
FIG. 1 is a longitudinal sectional front view of a sewage disposal tank.
Figure 2:
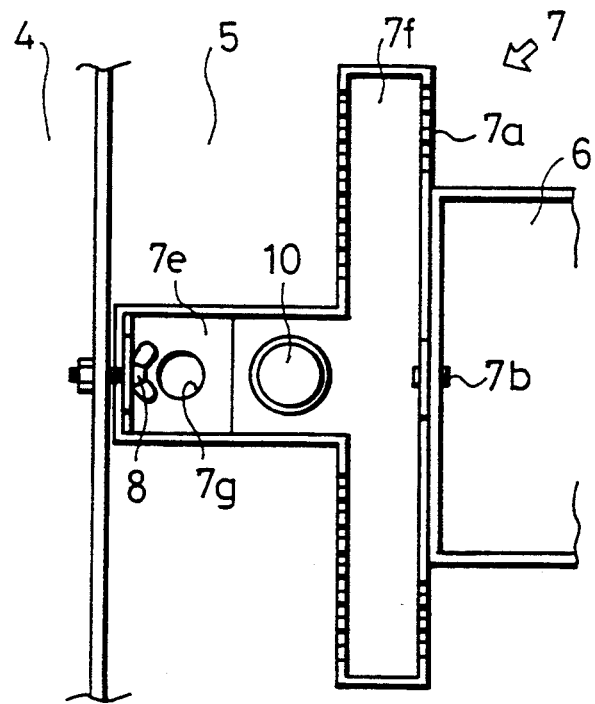
FIG. 2 is a transverse sectional plan view of the principal portions of the sewage disposal tank.
Figure 3:
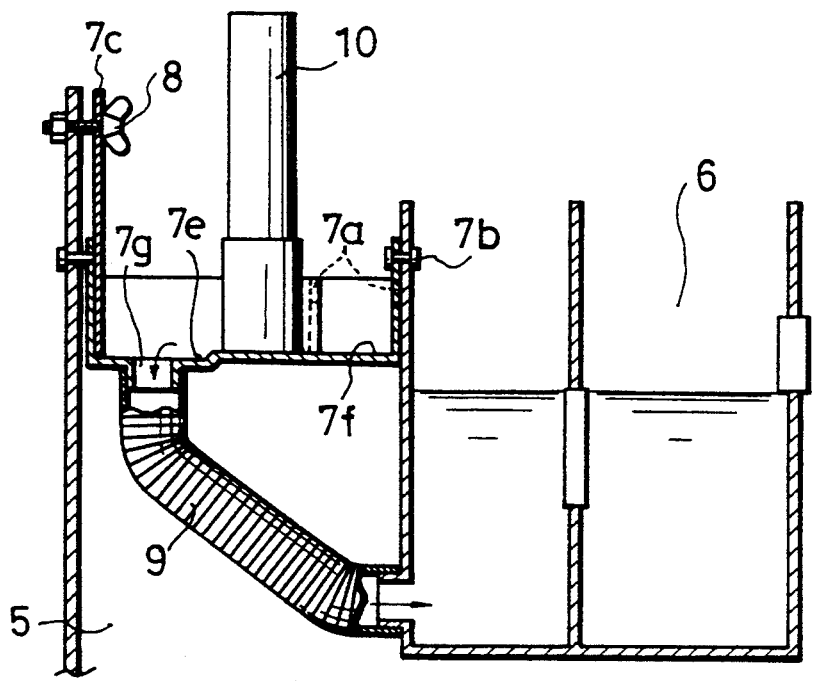
FIG. 3 is a longitudinal sectional plan view of the principal portions of the sewage disposal tank.

FIG. 1 shows one form of a known sewage disposal tank (of a combination system). This sewage disposal tank 1 is equipped at one of the ends thereof with an inflow port 1 of sewage, and includes a treatment chamber 2 comprising an anaerobic filtration first chamber, a treatment clamber 3 comprising likewise an anaerobic filtration second chamber, a treatment chamber 4 comprising a contact aeration tank, a treatment chamber 5 comprising a sedimentation tank, a treatment chamber 6 comprising a sterilization tank in the order named from the inflow port to post-stages, and an overflow weir 7 having a large number of V-shaped notches 7a continuously provided at the upper edge thereof is disposed at the upper part of the treatment chamber 5 (sedimentation tank) so as to allow water to naturally overflow when the water level rises inside the treatment chamber 5.

The gist of the construction of the present invention resides in that the center of the overflow weir 7 is supported at a fulcrum shaft 7b on the wall surface constituting the treatment chamber 5 in such a manner as to be capable of swinging, an arm 7c protruding upward is provided to the overflow weir 7, a concentric arcuate elongated hole 7d which is concentric with the fulcrum shaft 7b as the center is provided to the distal end of the arm 7c, and a set screw 8 disposed in the treatment chamber 5 is passed through, and engaged with, this elongated hole 7d so that it can be freely fastened and loosened.

Figure 4:
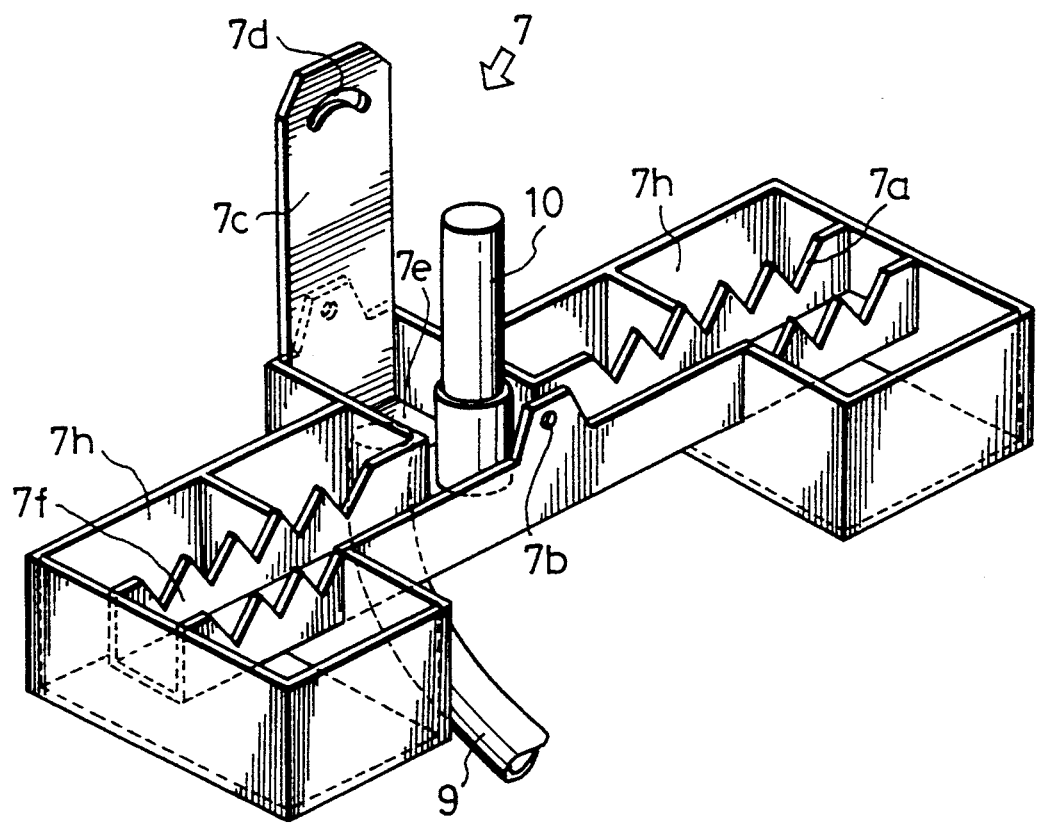
FIG. 4 is a perspective view of an overflow weir.
Figure 5:
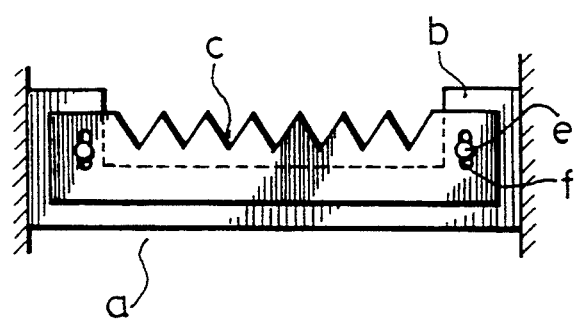
FIG. 5 is an explanatory view of an overflow weir according to the prior art.

A definite shape of the overflow weir 7 is illustrated in FIG. 4. Namely, a water gathering trough portion 7e having a U-shaped section is disposed at the center as shown in the drawing, and water guiding trough portions 7f, the bottom surface of which inclines toward the water gathering trough portion 7e, are disposed on the right and left sides of the trough portion 7e in such a manner as to integrally expand from the trough portion 7e. Therefore, the overflow weir 7 has a T-shaped plane as a whole, and V-shaped notches 7a described above are formed at the upper edge of vertical walls that constitute the water guiding through portions 7f and oppose each other.

A discharge port 7g is disposed on the bottom surface of the water gathering trough portion 7e, and communicates with the treatment chamber 6 (sterilization tank) through a conduit 9.

Reference numeral 10 denotes a chemical cylinder which is disposed upright on the water gathering trough portion 7e, and reference numeral 7h denotes an enclosure the upper and lower end of which are opened so as to smoothly guide water to the notches 7a.

When sewage flows from the inflow port 1 into the sewage disposal tank A and the water level of each treatment chamber exceeds a predetermined level, the water level of the treatment chamber 5 (sedimentation tank) temporarily rises and along with this rise, water inside the treatment chamber 5 overflows into the right and left guiding trough portions 7f through the notches 7a of the overflow weir 7 and water in the trough portion 7f is guided to the gathering trough portion 7e and comes into contact with the chemical. Thereafter, this water is sent into the treatment chamber 6 (sterilization tank) through the conduit 9, and is taken out from the treatment chamber 6 as treated water.

A method of regulating the horizontality of the overflow weir as the characterizing feature of the present invention comprises loosening the set screw 8, causing the overflow weir to the right or left with the fulcrum shaft 7b being the center to regulate the horizontal posture, and thereafter fastening again the set screw 8.

EFFECT OF THE INVENTION

The present invention provides the following effects.

(a) The center portion of the overflow weir is so supported by the fulcrum shaft as to be capable of swinging. Therefore, adjustment can be made by the mere swinging operation. Since the overflow weir of the invention is free from irregular motion in the longitudinal and oblique directions, the horizontal attitude can be easily obtained.

(b) When the overflow weir is fastened again after being adjusted to the horizontal attitude, the overflow weir is supported by the fulcrum shaft. Accordingly, the horizontal balance of the overflow weir is not lost, and the weir can be set stably and correctly to the horizontal attitude.

What is claimed is:

1. In a sewage disposal tank of the type having a plurality of chambers including a settling chamber wherein an overflow weir equipped at the upper edge thereof with a large number of V-shaped notches formed continuously for permitting natural overflowing of water at the time of the rise of a water level is transversely supported by support means, the improvement comprising a support mechanism of an overflow weir wherein said support means of said overflow weir pivotally supports the center portion of said overflow weir via a fulcrum shaft in such a manner that said overflow weir can swing to the right and left, and a swing position fixing member is engaged with said overflow weir.

2. A support mechanism of an overflow weir in a sewage disposal tank according to claim 1, wherein said overflow weir comprises:

water guiding trough portions expanding equidistantly to the right and left from said fulcrum shaft comprising a bottom inclining towards the center and vertical walls disposed along said bottom and having V-shaped notches at the upper edge thereof;

a water gathering trough portion for accepting water overflowing to said water guiding trough portions through said notches communicating with the center portion of said water guiding trough portions;

a chemical storage means for bringing water, which flows into said water gathering trough portion, into contact with a chemical provided in the water gathering trough portion; and means for allowing communication of said water gathering trough portion with a downstream treatment chamber so as to take out water which has connected said chemical.

* * * * *